Figures 1, 2:
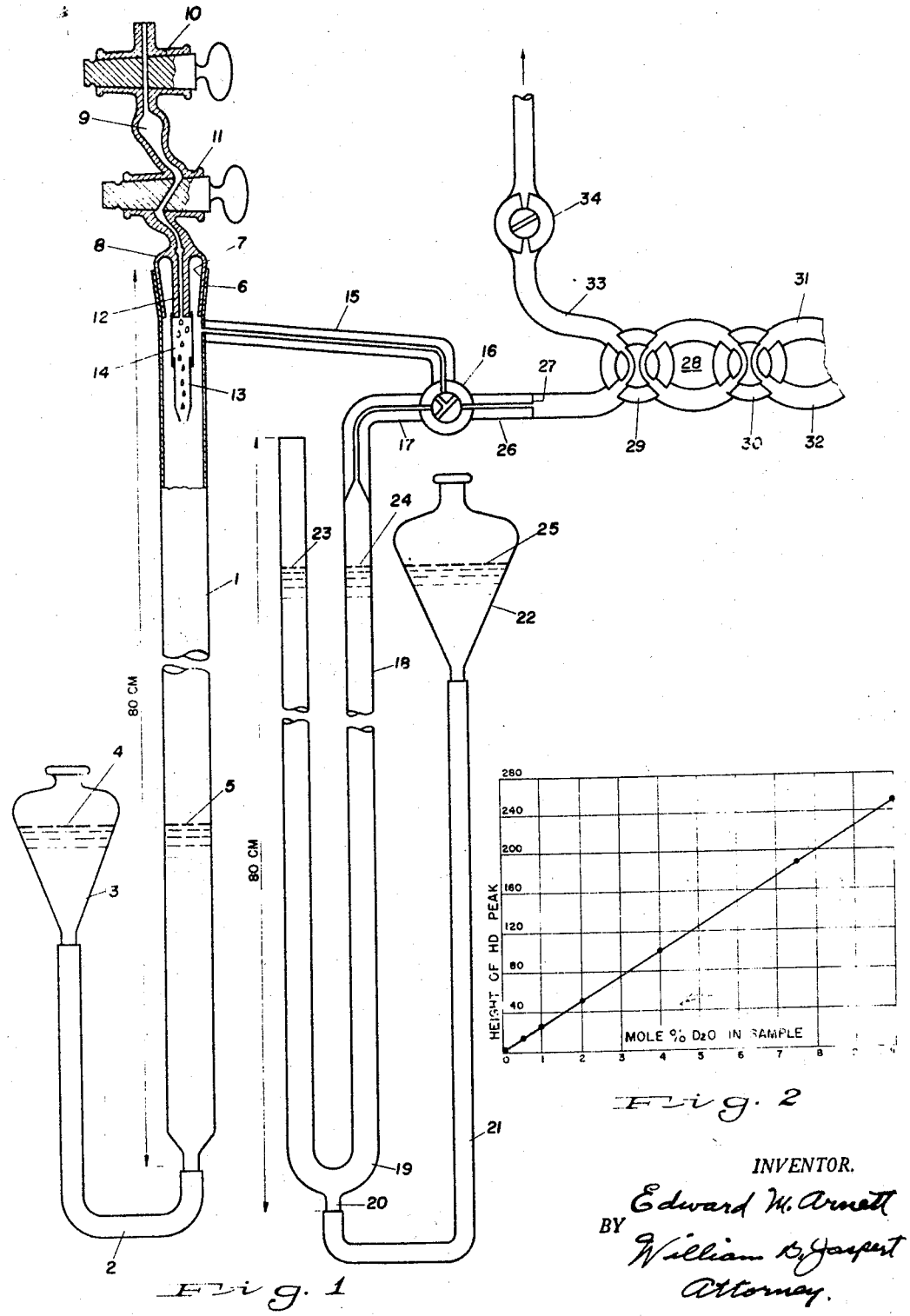

INVENTOR.
Edward M. Arnett 3,208,826
METHOD OF ANALYZING WATER SAMPLES
FOR DEUTERIUM CONTENT
Edward M. Arnett, 518 Roslyn Place, Pittsburgh, Pa.
Filed Feb. 23, 1961, Ser. No. 91,111
1 Claim. (Cl. 23—230)

This invention relates to new and useful improvements in the method of analyzing water samples for deuterium content by means employing a standard gas chromatography instrument and it is among the objects thereof to determine the deuterium content without the need of separating the deuterium and hydrogen.

It is a further object of the invention to analyze the deuterium from heavy water by reaction to form gases by bringing a small quantity of sample into reactive contact with calcium hydride or other suitable chemical which will serve to generate hydrogen and/or HD from water or deuterium oxide and introducing a measured portion of the gas phase sample into a gas chromatographic instrument.

It is yet another object of the invention to measure the difference in concentration of the hydrogen-deuterium mixture compared to pure hydrogen by thermal conductivity detector.

It is a well-known fact that hydrogen can exist in several isotopic forms. One such form is deuterium (D). Ordinary hydrogen (H) possesses a single proton in the nucleus with a single planetary electron. Deuterium (D), on the other hand, while still possessing a single planetary electron, also contains a neutron in the nucleus, thus giving an isotope having similar chemical properties to hydrogen but having about twice as great mass. Hydrogen and deuterium can combine to form a mixed molecule, (hydrogen deuteride, HD), as well as the molecules $H_2$ and $D_2$. Hydrogen of course, combines with oxygen to form water ($H_2O$) and likewise deuterium combines with oxygen to form heavy water ($D_2O$). The analysis for deuterium, hydrogen deutride and deuterium oxide on small samples of mixed waters is an important analytical determination. Heretofore the predominant method has been the use of a mass spectrometer which, while yielding accurate results, is an expensive instrument and not readily available to many smaller laboratories. The other methods involve accurate determination of the density of small samples which is difficult and tedious. The density method requires scrupulous purification of the water while the present method does not.

Deuterium is useful in tracer compounds, i.e., deuterium in the form of the proper compound makes it possible to follow the course of an atom or a compound through a complicated series of reactions. Deuterium compounds are also useful in kinetic studies to determine the isotope effect on bond breaking. In addition, the determination of deuterium may have important clinical and medical uses.

The invention will become more apparent from a consideration of the accompanying drawing constituting a part hereof in which like reference characters designate like parts and in which:

FIGURE 1 is a front elevational view, partially in section, of apparatus for generating the gas sample that is released into the carrier stream of the gas chromatograph; and, FIGURE 2 is a chart showing the relation of peak height to mole percent $D_2O$.

In the drawing, numeral 1 designates a receiver for the generated gases. The glass tube 1 is connected by rubber hose 2 to leveling bulb 3. Tube 1, hose 2 and bulb 3 are filled with mercury, as shown by the liquid level at 4 and 5. Tube 1 has a flared mouth 6 which is ground for easy disconnection with joint 7 of the generator portion generally designated by the numeral 8.

Generator 8 has a reservoir 9 located between two stopcocks 10 and 11 and the lower portion terminates in a fine bore tube 12 which is connected to the generator chemical tube 13 by rubber sleeve 14. Tube 13 is filled with a material such as calcium hydride.

A side tube 15 connects tube 1 with a T bore, three-way stop cock 16, the left leg 17 of which terminates in manometer 18. The lower end 19 of the manometer has a T connection 20 for a rubber hose 21 attached to a leveling bulb 22. Both legs of manometer 18, the hose 21 and bulb 22 are filled with mercury, as shown by the liquid level lines 23, 24 and 25.

The right leg 26 of stopcock 16 is connected at 27 to a conventional gas chromotographic sampler 28 having two four-way stopcocks 29 and 30. The connection 31 leads to the source of the carrier gas such as hydrogen and 32 to the column of a standard chromatographic instrument (not shown). Stopcock 29 is connected by tube 33 to an on-off stopcock 34 which goes to a vacuum pump (not shown).

The operation of the above-described apparatus is briefly as follows:

The stopcocks 10, 11 and 16 are connected, as shown in the drawing, and stopcock 34 is turned to on position and the vacuum pump is started. Stopcock 16 is then set to interconnect all three legs 15, 17 and 26 and under these conditions the top section of tube 1, the top section of the right leg of manometer 18 and gas sampler 28 are evacuated. Stopcock 16 is then turned, as shown in the drawing, to isolate tube 1 from the manometer 18 and gas sampler 28. The sample of liquid containing $H_2O$, $D_2O$ and HOD is then admitted through stopcock 10 into reservoir 9 and then carefully admitted by cracking stopcock 11 into reaction tube 13.

As the $D_2O$, $H_2O$ and HOD come into contact with the calcium hydride in tube 13, hydrogen deuteride and hydrogen are generated and are trapped in tube 1. When sufficient generated sample has been accumulated in tube 1, stopcock 34 is closed and the sample is forced through stopcock 16 over into gas phase sampler 28 and manometer 18. The pressure in the sampler 28 can readily be adjusted and measured by means of leveling bulbs 3 and 22. Atmospheric pressure is usually used.

When the sample has been trapped and the pressure set in sampler 28, then stopcock 29 is turned 90°, trapping a sample under known pressure in the tubes connecting 28 and then stopcock 30 is turned 90° so that the carrier gas from 31 sweeps the sample out of 28 into 32 leading to the chromatographic column (not shown).

The reactions of the sample entering the generator chemical tube 13 with calcium hydride are as follows:

(1) $\quad CaH_2 + 2H_2O \longrightarrow Ca(OH)_2 + 2H_2$ (2) $\quad CaH_2 + 2D_2O \longrightarrow Ca(OD)_2 + 2HD$ (3)

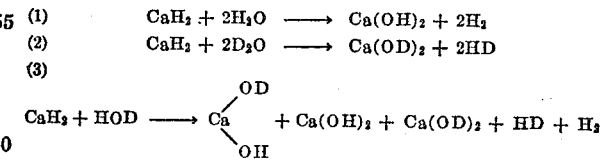

These reactions have not been proved to be the only ones to occur, but the overall effect is the same as if they were.

From Equation 2 it can be seen that for each molecule of $D_2O$ there is a molecule of HD formed. When a measured portion of gas phase sample passes through 32 to the chromatographic column in which the carrier gas is hydrogen and in which the column is a surface active material which will separate all other gases except hydrogen or deuterium, the hydrogen used as a carrier serves to mask out the hydrogen in the sample and sweeps the HD through the column, separating it from air or any other gases which might be present. The recording katharometer of the chromatographic instrument is used to determine the concentration of the hydrogen, HD mixture compared to pure hydrogen. It is well known that there is a difference in the thermal conductivity of $H_2$ and HD. A measurement of the thermal conductivity of HD will also determine the deuterium content.

The chart of FIGURE 2 shows that the relation of peak height to mole percent $D_2O$ is strictly linear. Recent work extends this linear relation to cover the whole range of $D_2O$–$H_2O$ mixtures to 100% $D_2O$. This makes calibration very simple.

It is evident from the foregoing description of this invention that it is not necessary to actually fractionate or separate the hydrogen from the deuterium except to separate hydrogen and deuterium from other gases which might interfere with the analysis.

I claim:

In the method of analyzing aqueous solutions containing mixed light and heavy waters for deuterium content, the steps of;

(a) passing a sample of the solution into a tube containing calcium hydride to generate gases $H_2$ and HD directly related in deuterium content to that of the original light and heavy water sample;

(b) trapping measured portions of the gases produced into a gas sampler associated with a chromatographic device;

(c) releasing the mixed gases in a carrier stream of $H_2$ to pass through a column of said chromatographic device packed with a surface active material which will separate extraneous gases except the carrier gas from the $H_2$ HD sample, and;

(d) determining the deuterium content of the $H_2$ HD portion of the sample by measuring its thermal conductivity relative to that of the carrier gases.

References Cited by the Examiner

UNITED STATES PATENTS

| | | | |
|---|---|---|---|
| 2,373,112 | 4/45 | Francis | 23—254 |
| 2,373,113 | 4/45 | Francis | 23—254 |
| 2,848,306 | 8/58 | Blumer | 23—232 |
| 2,905,536 | 9/59 | Emmett et al. | 23—232 |
| 3,066,220 | 11/62 | Nief et al. | 23—230 X |
| 3,090,672 | 5/63 | Grotthuss et al. | |
| 3,118,735 | 1/64 | Favre et al. | |

OTHER REFERENCES

Arnett et al.: "Science" 131, 1680, 1681 (1960).

Linde et al.: "Anal. Chem." 30, 1250–1252 (1958).

Ohkoshi et al.: "Chem. Abst." 53, 13869 (1959), also "Bull. Chem. Soc. Japan" 31, 770–1 (1958).

MORRIS O. WOLK, *Primary Examiner.*

MAURICE A. BRINDISI, *Examiner.*